(12) United States Patent
Aoshima

(10) Patent No.: US 10,815,714 B2
(45) Date of Patent: Oct. 27, 2020

(54) OPENING/CLOSING MEMBER DRIVING DEVICE

(71) Applicant: DENSO CORPORATION, Kariya-shi, Aichi-ken (JP)

(72) Inventor: Hiroki Aoshima, Kariya (JP)

(73) Assignee: DENSO CORPORATION, Kariya (JP)

( * ) Notice: Subject to any disclaimer, the term of this patent is extended or adjusted under 35 U.S.C. 154(b) by 92 days.

(21) Appl. No.: 16/306,699

(22) PCT Filed: Jul. 12, 2017

(86) PCT No.: PCT/JP2017/025328
§ 371 (c)(1),
(2) Date: Dec. 3, 2018

(87) PCT Pub. No.: WO2018/012515
PCT Pub. Date: Jan. 18, 2018

(65) Prior Publication Data
US 2019/0128044 A1 May 2, 2019

(30) Foreign Application Priority Data

Jul. 12, 2016 (JP) .................................. 2016-137571

(51) Int. Cl.
*E05F 15/695* (2015.01)
*E05F 15/41* (2015.01)
(Continued)

(52) U.S. Cl.
CPC ............ *E05F 15/695* (2015.01); *E05F 15/41* (2015.01); *E05F 15/689* (2015.01); *E05Y 2900/55* (2013.01); *H02H 7/0851* (2013.01)

(58) Field of Classification Search
None
See application file for complete search history.

(56) References Cited

U.S. PATENT DOCUMENTS 4,376,971 A * 3/1983 Landgraf ............. H02H 7/0851
187/280
4,561,691 A * 12/1985 Kawai ................... B60J 7/0573
296/216.04
(Continued)

FOREIGN PATENT DOCUMENTS

CN 103782467 A 5/2014
JP 08-158738 * 6/1996
(Continued)

OTHER PUBLICATIONS

Sep. 12, 2017 International Search Report issued in International Patent Application No. PCT/JP2017/025328.

*Primary Examiner* — Richard M Camby
(74) *Attorney, Agent, or Firm* — Oliff PLC

(57) ABSTRACT

An opening/closing member driving device includes a motor that opens and closes an opening/closing member and a controller configured to perform an abnormality determination process and a masking process. The abnormality determination process determines occurrence of a foreign object being entrapped or caught by comparing driving information corresponding to a driving status of the motor to a predetermined threshold value. The masking process invalidates the abnormality determination process over a predetermined masking period when the motor is activated. The controller includes a correction unit. The correction unit corrects at least one of the masking period or the threshold value when the motor is activated in a direction opposite to that of a preceding operation in a state in which the opening/closing member is in a high-load range.

2 Claims, 3 Drawing Sheets

(51) Int. Cl.
*E05F 15/689* (2015.01)
*H02H 7/085* (2006.01)

(56) References Cited

U.S. PATENT DOCUMENTS

| | | | |
|---|---|---|---|
| 5,436,539 A | | 7/1995 | Wrenbeck et al. |
| 5,453,669 A | * | 9/1995 | Nishibe ................ H02H 7/0851 |
| | | | 318/432 |
| 9,239,579 B2 | | 1/2016 | Schlesiger et al. |
| 2003/0052634 A1 | * | 3/2003 | Mukai ................ G05B 19/0428 |
| | | | 318/445 |
| 2004/0227483 A1 | * | 11/2004 | Katsumata ........... H02H 7/0851 |
| | | | 318/469 |
| 2005/0174079 A1 | * | 8/2005 | Mersch ................ E05F 15/431 |
| | | | 318/280 |
| 2007/0216330 A1 | * | 9/2007 | Kawakura .............. H02H 3/006 |
| | | | 318/432 |
| 2012/0209477 A1 | | 8/2012 | Ono et al. |
| 2014/0173984 A1 | | 6/2014 | Schlesiger et al. |

FOREIGN PATENT DOCUMENTS

| | | |
|---|---|---|
| JP | H08-158738 A | 6/1996 |
| JP | 2010-24646 A | 2/2010 |
| JP | 2011-122369 A | 6/2011 |
| JP | 2012-167433 A | 9/2012 |

\* cited by examiner

OPENING/CLOSING MEMBER DRIVING DEVICE

TECHNICAL FIELD

The present invention relates to an opening/closing member driving device.

BACKGROUND ART

A known opening/closing member driving device includes an anti-entrapping function which determines if a foreign object has been entrapped when closing a window glass from a rotation speed, an electric current value, or the like of a motor. When a foreign object is entrapped by the window glass, the opening/closing member driving device stops (or stops and then reverses) the motor. Nowadays, an opening/closing member driving device includes an anti-catching function to prevent a foreign object from being caught when opening the window glass (for example, refer to patent document 1). In such an opening/closing member driving device, the rotation speed, the electric current value, and the like of the motor are unstable during when the motor is activated. The opening/closing member driving device performs a masking process that invalidates an abnormality determination process for determining entrapment and catching over a predetermined masking period when activating the motor. Moreover, such an opening/closing member driving device may correct the masking period in taking into consideration wear of a transmission member such as a looped wire coupling the motor and the window glass (for example, refer to patent document 2).

PRIOR ART LITERATURE

Patent Literature

Patent Document 1: Japanese Laid-Open Patent Publication No. 2011-122369
Patent Document 2: Japanese Laid-Open Patent Publication No. 2010-24646

SUMMARY OF THE INVENTION

Problem to be Solved by the Invention

With the opening/closing member driving device, various drive patterns can be performed such as driving the window glass to an intermediate position of a movable range and then driving the window glass in a reverse direction. For example, when the window glass is driven to a high-load range within a drive range, a large amount of slack forms in a portion of the looped wire at a side opposite to the pulled side of the wire. In such a state, when the motor is activated in a direction opposite to that in which the motor was driven in the preceding operation, the slack may cause the rotation speed of the motor to temporarily rise greatly. This results in the rotation speed subsequently decreasing greatly. The opening/closing member driving device cannot cope with such a case and may erroneously determine that entrapment or catching has occurred. If the masking period is constantly extended or a threshold used for the determination is constantly moderated so as to avoid erroneous determination, entrapment or catching would be undetected.

One object of the present invention is to provide an opening/closing member driving device that reduces erroneous determination of entrapment or catching.

Means for Solving the Problem

An opening/closing member driving device that achieves the above object according to one embodiment includes a motor that opens and closes an opening/closing member and a controller configured to perform an abnormality determination process and a masking process. The abnormality determination process determines occurrence of a foreign object being entrapped or caught by comparing driving information corresponding to a driving status of the motor to a predetermined threshold value. The masking process invalidates the abnormality determination process over a predetermined masking period when the motor is activated. The controller includes a correction unit. The correction unit corrects at least one of the masking period or the threshold value when the motor is activated in a direction opposite to that of a preceding operation in a state in which the opening/closing member is in a high-load range.

EMBODIMENTS OF THE INVENTION

A power window device according to one embodiment will now be described with reference to FIGS. 1 to 5.

Figure 1:
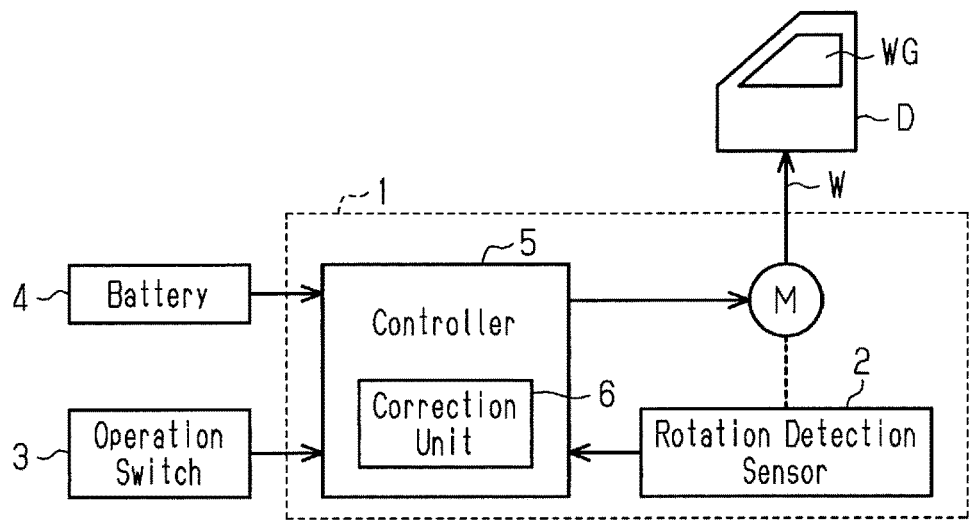
FIG. 1 is a schematic diagram showing a structure of a power window device according to an embodiment.

As shown in FIG. 1, a vehicle door D includes a window glass WG that serves as an opening/closing member and is vertically movable. The window glass WG is drive-coupled to a motor M of a power window device 1, which serves as an opening/closing member driving device, by a looped wire W (regulator) or the like, which serves as a transmission member.

The power window device 1 includes a rotation detection sensor 2, such as a Hall sensor integrated circuit (IC), and a controller 5. The rotation detection sensor 2 detects the rotation of the motor M. The controller 5 supplies power from a battery 4 to the motor M based on a signal from the rotation detection sensor 2, a signal from an operation switch 3, and the like. That is, the rotation detection sensor 2 outputs a pulse signal to the controller 5 in accordance with the rotation of the motor M. The controller 5 includes a microcomputer, a drive circuit, and the like. The controller 5 performs various controls while detecting a position and a speed of the window glass WG with the input pulse signal to drive-control the motor M.

More specifically, when the operation switch 3, which is arranged on the vehicle door D, is operated, the controller 5 drive-controls the motor M to open or close (vertically move) the window glass WG in response to the operation.

Further, the controller 5 calculates a rotation speed of the motor as driving information based on the pulse signal from the rotation detection sensor 2 indicating a driving status of the motor M. The controller 5 performs an abnormality determination process that determines whether a foreign object has been entrapped or caught by comparing the rotation speed to a predetermined threshold. When determining that a foreign object has been entrapped or caught, the controller 5 stops (or stops and then reverses) the motor M. The controller 5 performs the entrapment determination when closing the window glass WG and performs the catching determination when opening the window glass WG.

Further, the controller 5 performs a masking process that invalidates the abnormality determination process over a predetermined masking period when activating the motor M.

The controller 5 in the present embodiment includes a correction unit 6 that corrects the masking period when the motor M is activated in a direction opposite to that of the preceding operation in a state in which the window glass WG is located in a high-load range within a drive range.

Figure 3:
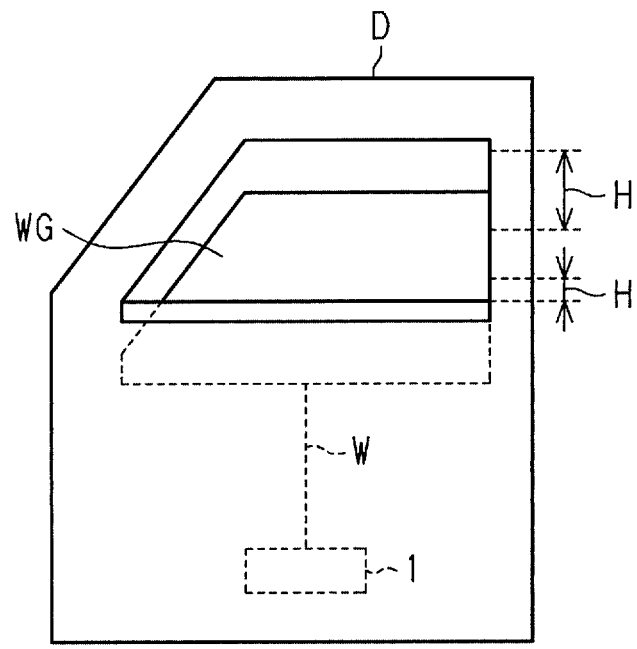
FIG. 3 is a schematic diagram illustrating a high-load range according to an embodiment.

Specifically, for example, as shown in FIG. 3, a range in which the load is high when opening the window glass WG is set as a high-load range H. When opening the window glass WG (its upper end) to the high-load range H and then closing the window glass WG, the correction unit 6 corrects the masking period to be longer (than other situations). The high-load range H is independently set for an opening operation and a closing operation.

Figure 4:
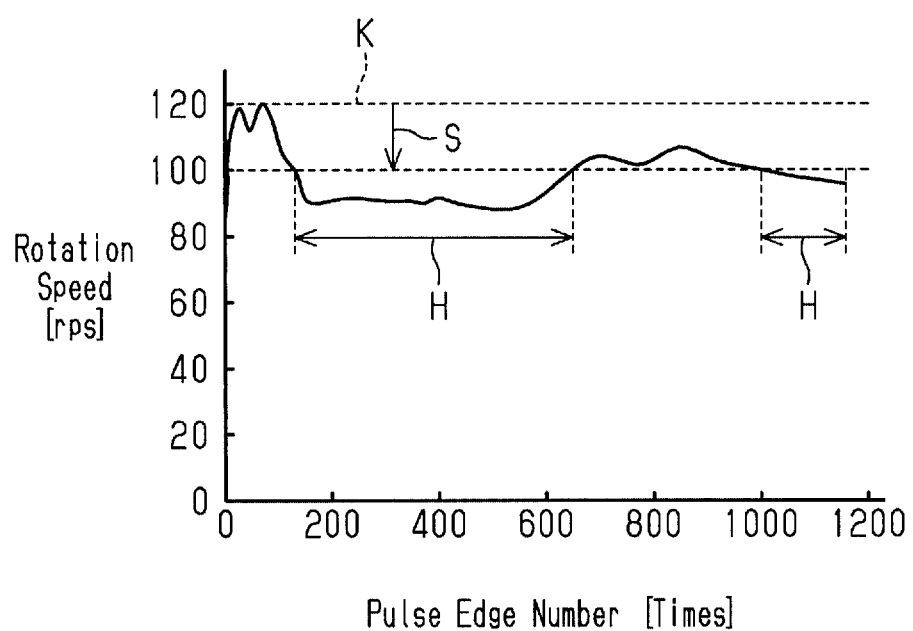
FIG. 4 is a waveform chart illustrating a setting process of the high-load range according to an embodiment.

As shown in FIG. 4, the controller 5 in the present embodiment sets a highest rotation speed of the motor M during initial driving as a reference speed K. Further, the controller 5 sets a range in which the speed of the motor M is lower than or equal to a speed that is less than the reference speed K by a predetermined speed S as the high-load range H. In FIG. 4, a state in which the number of pulse edges is the minimum of "0" corresponds to a state in which the window glass WG is at a fully closed position, and a state in which the number of pulse edges is the maximum of "1150" corresponds to a state in which the window glass WG is at a fully open position. Accordingly, FIG. 4 is a waveform illustrating the rotation speed of the motor M when the window glass WG is driven from the fully closed position to the fully open position. The controller 5 in the present embodiment sets the high-load range H as described above whenever the window glass WG is continuously driven over the entire range between the fully closed position and the fully open position.

The operation of the correction unit 6 will now be described in detail with reference to FIG. 2.

Figure 2:
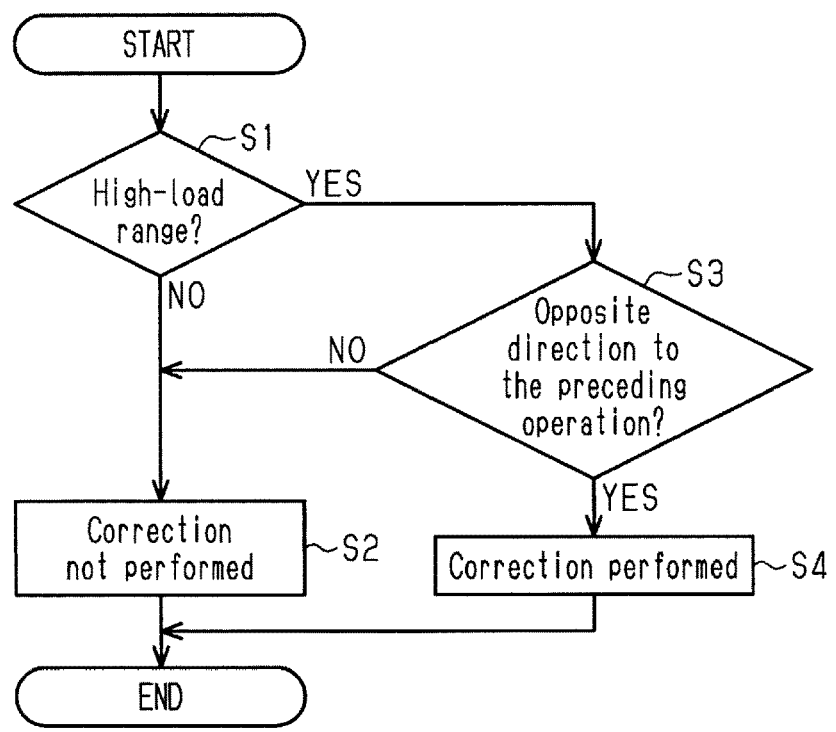
FIG. 2 is a flowchart illustrating a process performed by a correction unit according to an embodiment.

As shown in FIG. 2, when the operation switch 3 is operated to actuate the window glass WG, the controller 5 (correction unit 6) performs processes from step S1 and then starts supplying power to the motor M so as to actuate the window glass WG.

More specifically, in step S1, the correction unit 6 determines whether or not the window glass WG (its upper end) is located in the high-load range H. When determining that the window glass WG is not in the high-load range H, the correction unit 6 proceeds to step S2 and sets the regular masking period (short period, for example, period P1 until the number of pulse edges exceeds "30" as shown in FIG. 5) without performing a correction.

Further, in step S1, when determining that the window glass WG (its upper end) is located in the high-load range H, the correction unit 6 proceeds to step S3.

In step S3, the correction unit 6 determines whether or not the motor M has been activated in a direction opposite to that of the preceding operation (whether operation switch 3 has been operated to drive motor M in opposite direction). When determining that the motor M has not been driven in the direction opposite to that of the preceding operation, the correction unit 6 proceeds to step S2 and sets the regular masking period without performing a correction.

Figure 5:
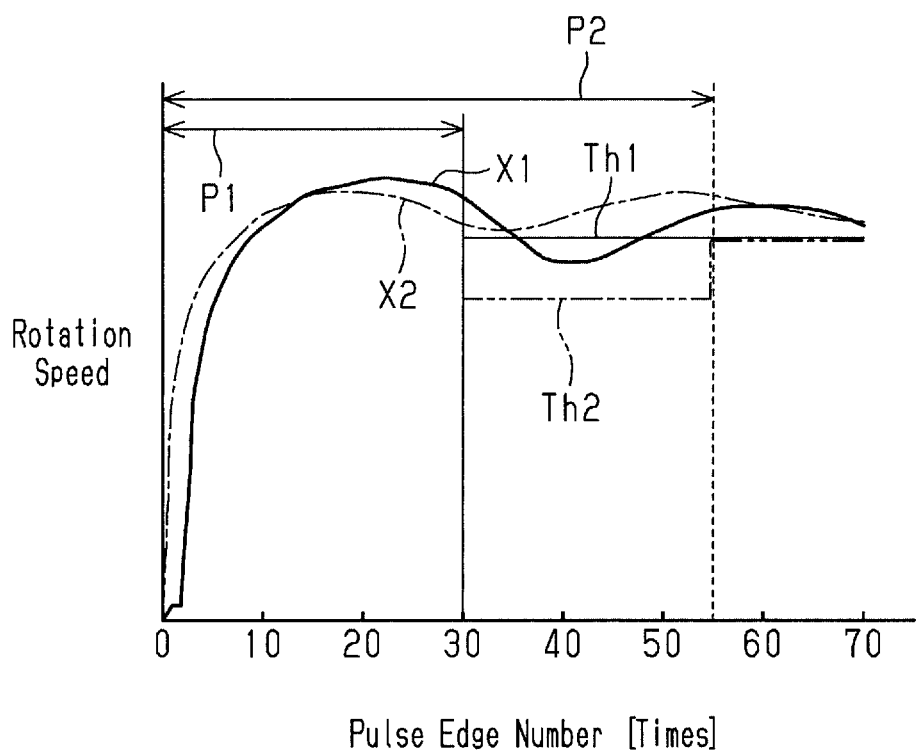
FIG. 5 is a waveform chart illustrating an operation of the power window device according to an embodiment.

In step S3, when it is determined that the motor M has been activated in the direction opposite to that of the preceding operation, the correction unit 6 proceeds to step S4 and corrects the masking period to a period longer than the regular period (for example, to period P2 until the number of pulse edges exceeds "55" as shown in FIG. 5).

The operation of the power window device 1 will now be described.

For example, in a state in which the window glass WG is stopped after having been driven to open from the fully closed position to a position in the high-load range H, a large amount of slack forms in a portion of the looped wire W at a side opposite to the side at which the wire W is pulled. When the operation switch 3 is then operated to close the window glass WG, the correction unit 6 corrects the masking period to period P2, which is longer than the regular period.

In this case, as shown by a characteristic curve X1 in FIG. 5, the large slack in the wire W may cause the rotation speed of the motor M to temporarily rise greatly. This results in the rotation speed subsequently decreasing greatly. In such a case, if the masking period is set to period P1, the rotation speed greatly decreases after the masking period (P1) and becomes lower than a threshold value Th1. This results in an erroneous entrapment determination. However, the masking period has been corrected to period P2 which is longer than the regular period thereby invalidating the abnormality determination process. This reduces erroneous entrapment determination.

Further, for example, in a state in which the window glass WG is stopped after being opened and driven to a position outside the high-load range H (i.e., low-load range) from the fully closed position, a large amount of slack does not form in the looped wire W at a side opposite to the side where the wire W is pulled. When the operation switch 3 is then operated to close the window glass WG, the window glass WG is closed without a correction being performed on the masking period by the correction unit 6 (remains at regular period P1).

In this case, as shown by a characteristic curve X2 in FIG. 5, the rotation speed of the motor M does not rise greatly because the amount of slack in the wire W is small. Accordingly, the subsequent decrease in the rotation speed is also small. Thus, the rotation speed does not become lower than the threshold value Th1 and an erroneous entrapment determination does not occur. Further, the masking period is set to the regular period P1 and does not remain long more than necessary. This allows the regular abnormality determination process (entrapment determination) to be readily performed.

The above embodiment has the advantages described below.

(1) The controller 5 includes the correction unit 6. When the motor M is driven in the direction opposite to that of the preceding operation in a state in which the window glass WG is in the high-load range H, the correction unit 6 corrects the masking period. Thus, the controller 5 is able to cope with the greatly changing rotation speed when the motor M is driven in the direction opposite to that of the preceding operation in a state in which the window glass WG is in the high-load range H. This reduces erroneous determinations in the abnormality determination process that detects the occurrence of entrapment and catching. As a result, for example, erroneous stopping and erroneous reversing are reduced.

(2) The controller 5 sets the highest rotation speed of the motor M during initial driving as the reference speed K.

Further, the controller 5 sets the speed range in which the speed of the motor M is lower than or equal to a speed that is less than the reference speed K by the predetermined speed S as the high-load range H. Accordingly, in a state in which the window glass WG, the motor M (power window device 1), and the like are all assembled together, the controller 5 can accurately set the range in which the load is actually high as the high-load range H.

(3) The controller 5 sets the high-load range H whenever the window glass WG is continuously driven over the entire range between the fully closed position and the fully open position. Accordingly, the high-load range H is set based on the most recent information whenever the window glass WG is continuously driven over the entire range between the fully closed position and the fully open position. Thus, for example, even if wear or the like changes the range in which the load is actually high, the current high-load range H is accurately set.

The above embodiment may be modified as described below.

In the above embodiment, the correction unit 6 corrects the masking period when the motor M is driven in the direction opposite to that of the preceding operation in a state in which the window glass WG is in the high-load range H. The present invention is not limited to correcting the masking period and instead, for example, the correction unit 6 may correct the threshold value used for the abnormality determination process. Specifically, for example, when the motor M is driven in the direction opposite to that of the preceding operation in a state in which the window glass GW is in the high-load range H, the correction unit 6 may correct the regular threshold value Th1 used for the abnormality determination process to a lower threshold value Th2 during a specified period as shown by the double-dashed line in FIG. 5.

In the above embodiment, the controller 5 sets the highest rotation speed of the motor M during initial driving as the reference speed K, and sets the range in which the speed of the motor M is lower than or equal to a speed that is less than the reference speed K by the predetermined speed S as the high-load range H. The high-load range H may be set through other processes. For example, the controller 5 may set a range in which the rotation speed of the motor M during initial driving is a speed lower than a predetermined reference speed as the high-load range H. Further, for example, the high-load range H may be predetermined based on a structural characteristic such as the relationship between the curved window glass GW and a window frame.

In the above embodiment, the controller 5 sets the high-load range H whenever the window glass WG is continuously driven over the entire range between the fully closed position and the fully open position. The present invention is not limited to such a configuration, and the high-load range H may be set at a different timing. For example, the high-load range H may be set when the window glass WG is continuously driven over the entire range between the fully closed position and the fully open position for a number of times (for example, ten times).

In the above embodiment, in FIG. 5, the threshold Th1 is constant. Instead, for example, the threshold value Th1 may be set based on load information (speed and the like) of each position of the window glass WG that has been detected (through learning function).

In the above embodiment, the driving information corresponding to the driving status of the motor M used for the abnormality determination process is the rotation speed, but instead the driving information may be the electric current value or the like.

In the above embodiment, the window glass WG and the motor M are drive-coupled by the looped wire W (regulator) or the like, which serves as a transmission member. The window glass WG and the motor M may be drive-coupled by an X-arm regulator or the like. In this case, the above advantages can also be obtained since the regulator is greatly deformed when the window glass GW is driven to the high-load range H.

In the above embodiment, the opening/closing member driving device is the power window device 1 but may instead be an opening/closing member driving member that drive-controls an opening/closing member other than the window glass GW.

The invention claimed is:

1. An opening/closing member driving device comprising:
    a motor that opens and closes an opening/closing member; and
    a controller configured to perform an abnormality determination process and a masking process, wherein:
    the abnormality determination process determines occurrence of a foreign object being entrapped or caught by comparing driving information corresponding to a driving status of the motor to a predetermined threshold value, and the masking process invalidates the abnormality determination process over a predetermined masking period when the motor is activated,
    the controller includes a correction unit that corrects at least one of the masking period or the threshold value when the motor is activated in a direction opposite to that of a preceding operation in a state in which the opening/closing member is in a high-load range, and
    the controller sets a highest rotation speed of the motor during initial driving as a reference speed, and sets a speed range in which the speed of the motor is lower than or equal to a speed that is less than the reference speed by a predetermined speed as the high-load range.

2. The opening/closing member driving device according to claim 1, wherein the controller sets the high-load range whenever the open-close member is continuously driven over an entire range between a fully closed position and a fully open position.

* * * * *